United States Patent
Attinella et al.

(10) Patent No.: US 7,478,219 B2
(45) Date of Patent: Jan. 13, 2009

(54) RETRIEVING EVENT DATA FOR LOGICAL PARTITIONS

(75) Inventors: John Michael Attinella, Rochester, MN (US); Randall Ray Heisch, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 11/106,007

(22) Filed: Apr. 14, 2005

(65) Prior Publication Data

US 2006/0236067 A1    Oct. 19, 2006

(51) Int. Cl.
G06F 12/00    (2006.01)

(52) U.S. Cl. .................. 711/173; 711/170

(58) Field of Classification Search .......... 711/170, 711/173
See application file for complete search history.

(56) References Cited

U.S. PATENT DOCUMENTS

| | | | | |
|---|---|---|---|---|
| 4,821,178 A | * | 4/1989 | Levin et al. | 714/47 |
| 5,134,271 A | * | 7/1992 | Sondergeld et al. | 235/376 |
| 5,796,939 A | * | 8/1998 | Berc et al. | 714/47 |
| 5,819,310 A | * | 10/1998 | Vishlitzky et al. | 711/114 |
| 6,430,652 B1 | * | 8/2002 | Fechser et al. | 711/111 |
| 2002/0016812 A1 | * | 2/2002 | Uchishiba et al. | 709/104 |

* cited by examiner

*Primary Examiner*—Matt Kim
*Assistant Examiner*—Michael C Krofcheck
(74) *Attorney, Agent, or Firm*—Owen J. Gamon

(57) ABSTRACT

A method, apparatus, system, and signal-bearing medium that, in an embodiment, retrieve event data from a processor for sampling intervals, where the sampling intervals are evenly distributed, but the control points at which the event data is retrieved are unevenly distributed. The processor executes instructions for logical partitions, and the event data is associated with events that are detected by the processor during the sampling intervals. In response to an interrupt received from the processor at the control point, a determination is made whether the sample point has been reached. If the sample point has been reached, the event data is retrieved from the processor and an event counter is reset to a value that is calculated to cause the processor to include an identical number of the events in the sampling intervals. The value is calculated based on the event counter at the time control point, the event counter at a time of the sample point, and the number of events in the sampling interval. In this way, an even distribution of event data may be collected when the processor is allocated to multiple partitions in a logically-partitioned system.

8 Claims, 7 Drawing Sheets

RETRIEVING EVENT DATA FOR LOGICAL PARTITIONS

FIELD

This invention generally relates to computer systems and more specifically relates to performance data collection in computer systems.

BACKGROUND

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago. One significant advance in computer technology is the development of parallel processing, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. From a software standpoint, multithreaded operating systems and kernels have been developed, which permit computer programs to concurrently execute in multiple threads, so that multiple tasks can essentially be performed at the same time.

In addition, some computers implement the concept of logical partitioning, where a single physical computer is permitted to operate essentially like multiple and independent virtual computers, referred to as logical partitions, with the various resources in the physical computer (e.g., processors, memory, and input/output devices) allocated among the various logical partitions via a partition manager, or hypervisor. Each logical partition executes a separate operating system, and from the perspective of users and of the software applications executing on the logical partition, operates as a fully independent computer.

Because each logical partition is essentially competing with other logical partitions for the limited resources of the computer, users are especially interested in monitoring the partitions in order to ensure that they are achieving satisfactory performance. A performance data collection tool that collects detailed performance metrics is often used for this purpose. One common performance data collection tool is an instruction address sampler within a processor that captures instruction addresses at preset intervals of processor cycles.

When sampling instruction addresses, the operating system will typically receive control from the processor via an interrupt mechanism upon the expiration of a sampling interval. The operating system then records the sample data (e.g., instruction addresses) and then initializes the next sample interval. To effectively analyze the performance of the computer system that contains multiple logical partitions running varied operating systems, users often desire to obtain a system-wide collection of instruction address samples. Unfortunately, capturing samples and setting fixed sample intervals across the entire system, including samples within the hypervisor, is problematic.

A first problem is that the hypervisor saves and restores the state of a physical processor when it allocates that processor to various partitions, which causes the state of the sampling logic in each processor to be specific to each partition and also hides the contribution of the hypervisor itself. A second problem is that the interrupt generated by the expiring interval is only seen by one particular partition, and not the hypervisor (the hypervisor operates with interrupts disabled), which makes system-wide performance data collection difficult. A third problem is that a partition is only aware of the processors allocated to it and is not aware of the existence of the physical processors of the entire computer system, which further makes a system-wide performance data collection difficult. These problems impair the usefulness of the performance data collected by instruction address samplers in a logically-partitioned system.

Hence, without a better technique for collecting performance data in logically-partition systems, users will continue to experience difficulty in performing performance analysis.

SUMMARY

A method, apparatus, system, and signal-bearing medium are provided that, in an embodiment, retrieve event data from a processor for sampling intervals, where the sampling intervals are evenly distributed, but the control points at which the event data is retrieved are unevenly distributed. The processor executes instructions for logical partitions, and the event data is associated with events that are detected by the processor during the sampling intervals. In response to an interrupt received from the processor at the control point, a determination is made whether the sample point has been reached. If the sample point has been reached, the event data is retrieved from the processor and an event counter is reset to a value that is calculated to cause the processor to include an identical number of the events in the sampling intervals. The value is calculated based on the event counter at the time control point, the event counter at a time of the sample point, and the number of events in the sampling interval. In this way, an even distribution of event data may be collected when the processor is allocated to multiple partitions in a logically-partitioned system.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
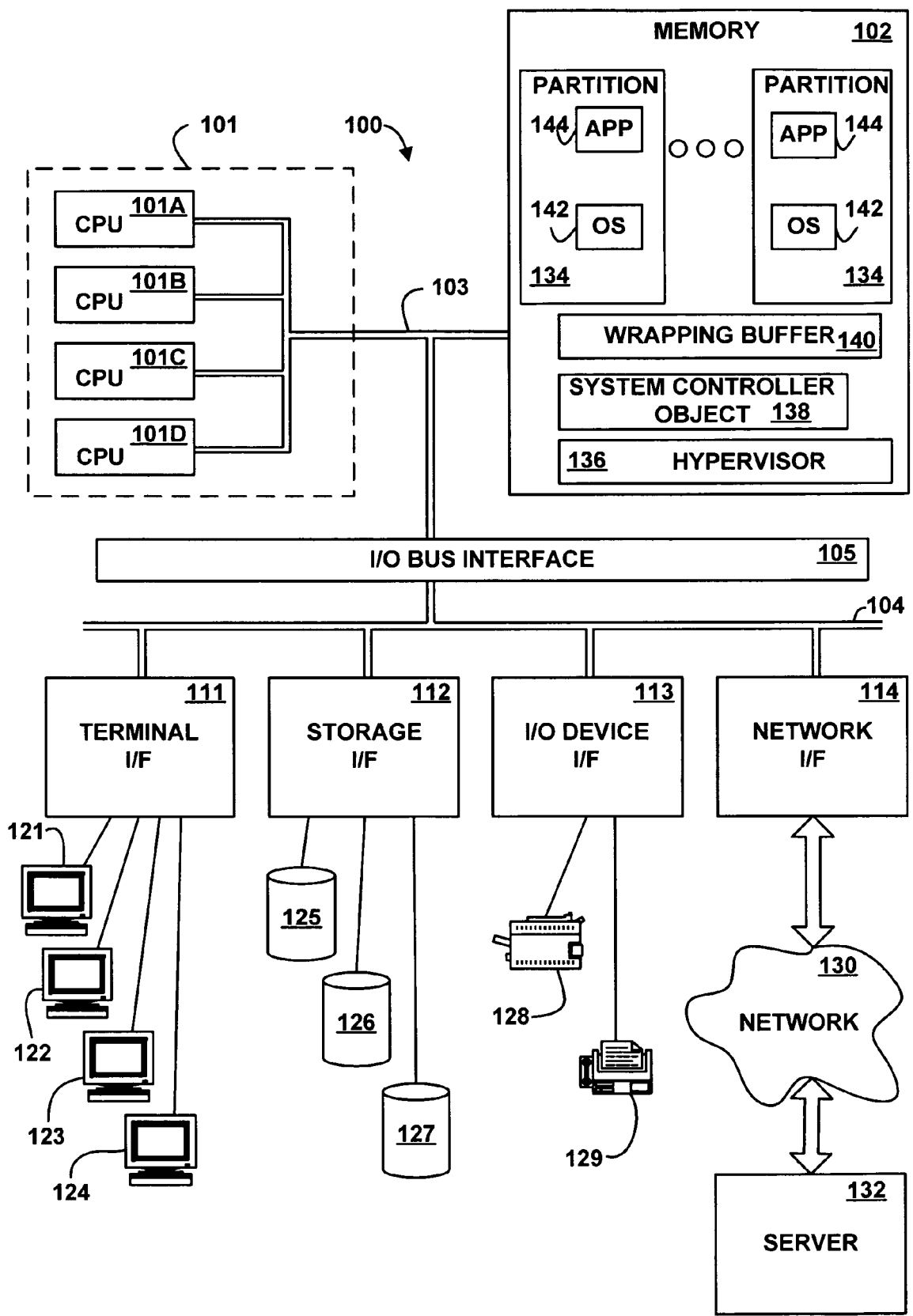
FIG. 1 depicts a high-level block diagram of an example system for implementing an embodiment of the invention.

Referring to the Drawings, wherein like numbers denote like parts throughout the several views, FIG. 1 depicts a high-level block diagram representation of a client computer system 100 connected via a network 130 to a server computer system 132, according to an embodiment of the present invention. The designations "client" and "server" are used for convenience only, and, in an embodiment, a computer that operates as a client to one computer may operate as server to another computer, and vice versa. In an embodiment, certain hardware components of the computer system 100 may be implemented by an IBM eServer Power 5 computer system. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache. The processor 101 is further described below with reference to FIG. 2A.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as containing the primary software components and resources utilized in implementing a logically partitioned computing environment on the computer 100, including a plurality of logical partitions 134 managed by a partition manager or hypervisor 136 via a system controller object 138 and a wrapping buffer 140.

Although the partitions 134, the hypervisor 136, the system controller object 138, and the wrapping buffer 140 are illustrated as being contained within the memory 102 in the computer system 100, in other embodiments some or all of them may be on different computer systems, e.g., the server 132, and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the partitions 134, the hypervisor 136, the system controller object 138, and the wrapping buffer 140 are illustrated as residing in the memory 102, these elements are not necessarily all completely contained in the same storage device at the same time.

Each of the logical partitions 134 utilizes an operating system 142, which controls the primary operations of the logical partition 134 in the same manner as the operating system of a non-partitioned computer. For example, each operating system 142 may be implemented using the i5OS operating system available from International Business Machines Corporation, but in other embodiments the operating system 142 may be Linux, AIX, UNIX, Microsoft Windows, or any appropriate operating system. Also, some or all of the operating systems 142 may be the same or different from each other. Any number of logical partitions 134 may be supported as is well known in the art, and the number of the logical partitions 134 resident at any time in the computer 100 may change dynamically as partitions are added or removed from the computer 100.

Each of the logical partition 134 executes in a separate, or independent, memory space, and thus each logical partition acts much the same as an independent, non-partitioned computer from the perspective of each application 144 that executes in each such logical partition. As such, user applications typically do not require any special configuration for use in a partitioned environment. Each of the applications 144 illustrated in FIG. 1 may be the same or some or all of them may be different from each other. Further, each of the partitions 134 may include multiple of the applications 144. In an embodiment, at least one of the applications 144 is a performance data collection tool.

Given the nature of the logical partitions 134 as separate virtual computers, it may be desirable to support inter-partition communication to permit the logical partitions 134 to communicate with one another as if the logical partitions 134 were on separate physical machines. As such, in some implementations it may be desirable to support an unillustrated virtual local area network (LAN) adapter associated with the hypervisor 136 to permit the logical partitions 134 to communicate with one another via a networking protocol such as the Ethernet protocol. In another embodiment, the virtual network adapter may bridge to a physical adapter, such as the network interface adapter 114. Other manners of supporting communication between partitions may also be supported consistent with embodiments of the invention.

Although the hypervisor 136 is illustrated as being within the memory 102, in other embodiments, all or a portion of the hypervisor 136 may be implemented in firmware or hardware. The hypervisor 136 may perform both low-level partition management functions, such as page table management and may also perform higher-level partition management functions, such as creating and deleting partitions, concurrent I/O maintenance, allocating processors, memory and other hardware or software resources to the various partitions 134.

The hypervisor 136 statically and/or dynamically allocates to each logical partition 134 a portion of the available resources in computer 100. For example, each logical partition 134 may be allocated one or more of the processors 101 and/or one or more hardware threads, as well as a portion of the available memory space. The logical partitions 134 can share specific software and/or hardware resources such as the processors 101, such that a given resource may be utilized by more than one logical partition. In the alternative, software and hardware resources can be allocated to only one logical partition 134 at a time. Additional resources, e.g., mass storage, backup storage, user input, network connections, and the I/O adapters therefor, are typically allocated to one or more of the logical partitions 134. Resources may be allocated in a number of manners, e.g., on a bus-by-bus basis, or on a resource-by-resource basis, with multiple logical partitions sharing resources on the same bus. Some resources may even be allocated to multiple logical partitions at a time. The resources identified herein are examples only, and any appropriate resource capable of being allocated may be used.

The hypervisor 136 includes instructions capable of executing on the processor 101 or statements capable of being interpreted by instructions executing on the processor 101 to perform the functions as further described below with reference to FIGS. 3, 4, 5, and 6. In another embodiment, the hypervisor 136 may be implemented in microcode or firmware. In another embodiment, the hypervisor 136 may be implemented in hardware via logic gates and/or other appropriate hardware techniques. The system controller object 138 is further described below with reference to FIG. 2B.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the server 132. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

FIG. 1 is intended to depict the representative major components of the computer system 100, the network 130, and the server 132 (which may include any or all of the elements previously described above for the computer system 100) at a high level; individual components may have greater complexity than represented in FIG. 1; components other than or in addition to those shown in FIG. 1 may be present; and the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
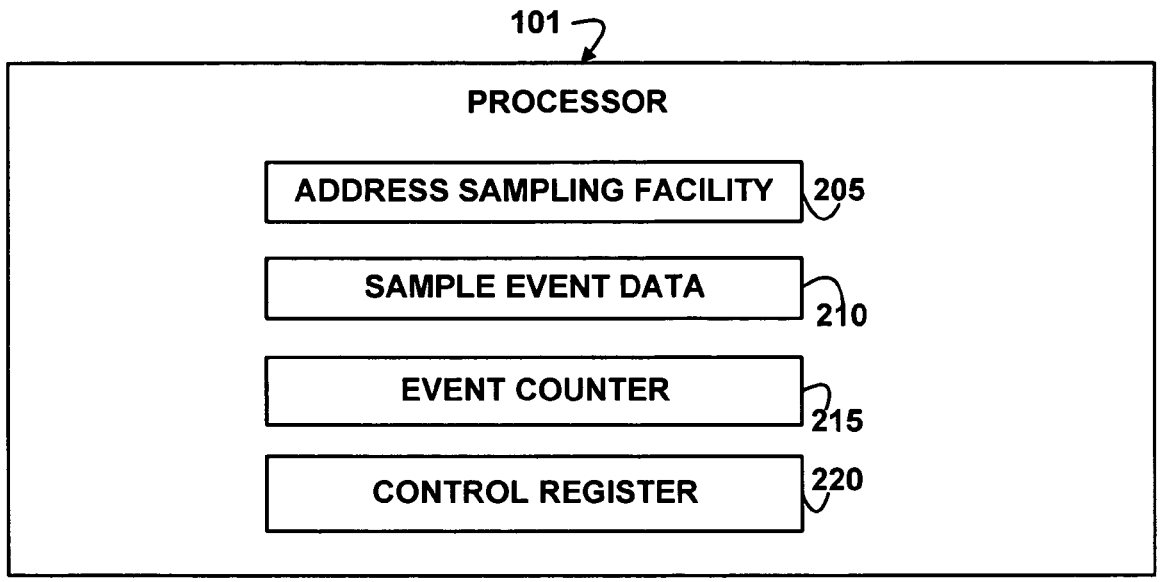
FIG. 2A depicts a block diagram of an example processor, according to an embodiment of the invention.

FIG. 2A depicts a block diagram of an example processor 101, according to an embodiment of the invention. The example processor 101 includes an address sampling facility 205, sample event data 210, an event counter 215, and a control register 220. The address sampling facility 205 detects events at the computer system 100, and in response saves the sample event data 210 regarding the events based on the values of the event counter 215 and the control register 220. In various embodiments, the address sampling facility 205 may be implemented by hardware, firmware, instructions which execute on the processor 101, or any combination thereof. The sample event data 210 stores data that the address sampling facility 205 collects regarding the events. In various embodiments, the sample event data 210 may include the address of the instruction that was executing on the processor 101 at the time that the event occurred, the address of the data that the instruction was accessing at the time that the event occurred, or any other appropriate data. In various embodiments, the events may be hardware and/or firmware conditions that are capable of being detected, counted, and used as a stimulus by the address sampling facility 205. Examples of event types include a threshold number of processor cycles occurring, cache misses, the execution of load instructions by the processor 101, the execution of write instructions by the processor 101, or any other appropriate event type.

The event counter 215 may be a register or a memory location within the processor 101 that the sampling data facility 205 uses to count the number of events that have occurred. When the event counter 215 exceeds a threshold, a sample point occurs. The control register 220 stores values received from the hypervisor 136, which the address sampling facility 205 uses to control its operations, as further described below with reference to FIGS. 2B, 3, and 4.

Figure 2B:
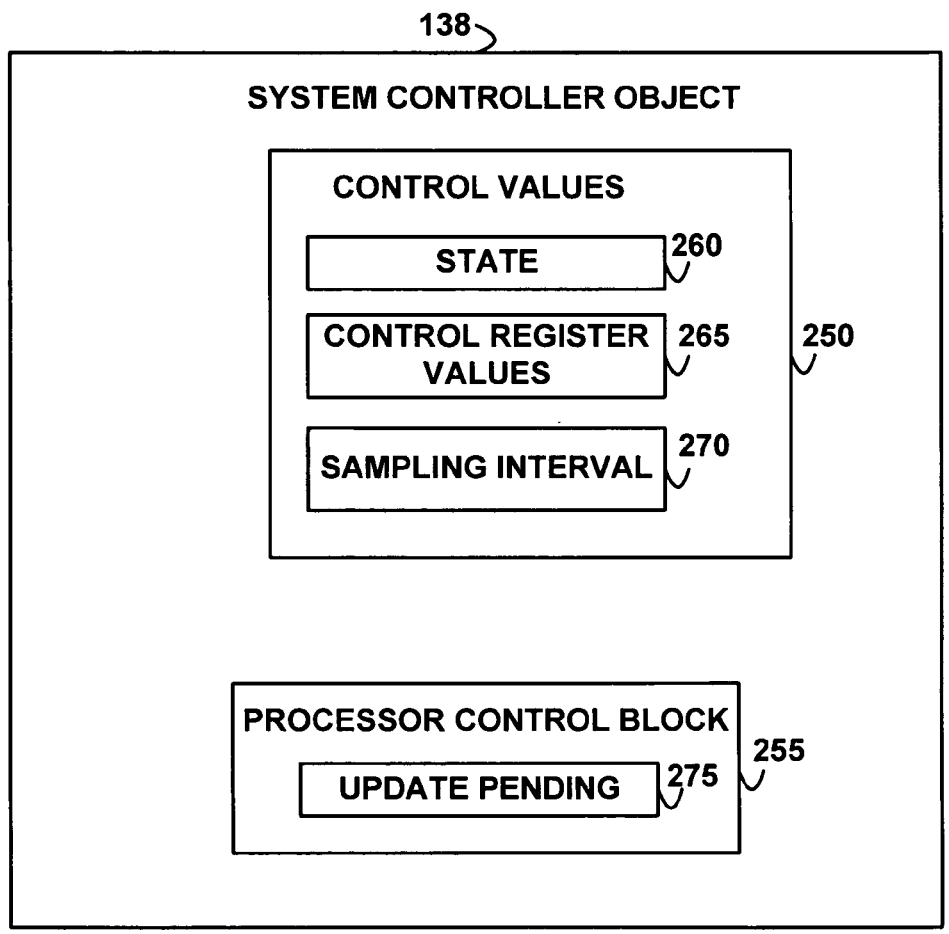
FIG. 2B depicts a block diagram of an example system controller object, according to an embodiment of the invention.

FIG. 2B depicts a block diagram of an example system controller object 138, according to an embodiment of the invention. The example system controller object 138 includes control values 250 and a processor control block 255. The control values 250 include a state 260, control register values 265, and a sampling interval 270.

The state 260 indicates whether the hypervisor 136 is operating in a normal mode, in which every partition 134 may access the sample event data 210, or whether the hypervisor 136 is in a system-wide address sampling mode in which only one partition 134 may access the sample event data 210. In normal mode, the sample event data 210 and the system controller object 138 that are visible and/or alterable to each partition 134 are related to that partition alone. Since the hypervisor 136 saves/restores the processor state associated with that partition when the hypervisor 136 dispatches the processors 101, each partition 134 is restricted to its own memory space and to the processor or processors that are allocated to it. In contrast, when the system-wide address sampling mode is activated, the saving/restoring of the processor hardware facilities related to address sampling and event counting are not saved/restored across processor dispatching, which allows the system-wide view. In an embodiment, the hypervisor 136 only allows one partition at a time to use the system-wide address sampling mode, in order to ensure that multiple of the partitions 134 are not attempting to modify/use this system-wide resource at the same time.

The control register values 265 include an identification of the event type or types that the processor 101 is to detect and an identification of the type of sample event data 210 that the processor 101 is to save in response to encountering the events. The sampling interval 270 is the number of events (e.g., the number of processor cycles, number of load instructions, number of store instructions, etc) between sample points. A sample point marks or bounds the end of a sample interval with which the sample event data 210 is associated.

The processor control block 255 includes an update pending indicator 275. The update pending indicator 275 instructs the processor 101 to update its control register 220 with the values in the control register values 265 and the sampling interval 270 at the next control point. A control point is a mechanism that allows the hypervisor 136 to gain control of the processor 101 at instrumented points within the processor 101. These instrumented points may be, in various embodiments, decrementer interrupt handler logic, logic that handles partition switching (giving control back to the hypervisor 136 when the partition 134 has no further work to perform), or any other appropriate logic points. Although only one processor control block 255 is illustrated, in another embodiment an individual processor control block 255 may be present for each of the processors 101.

Figure 3:
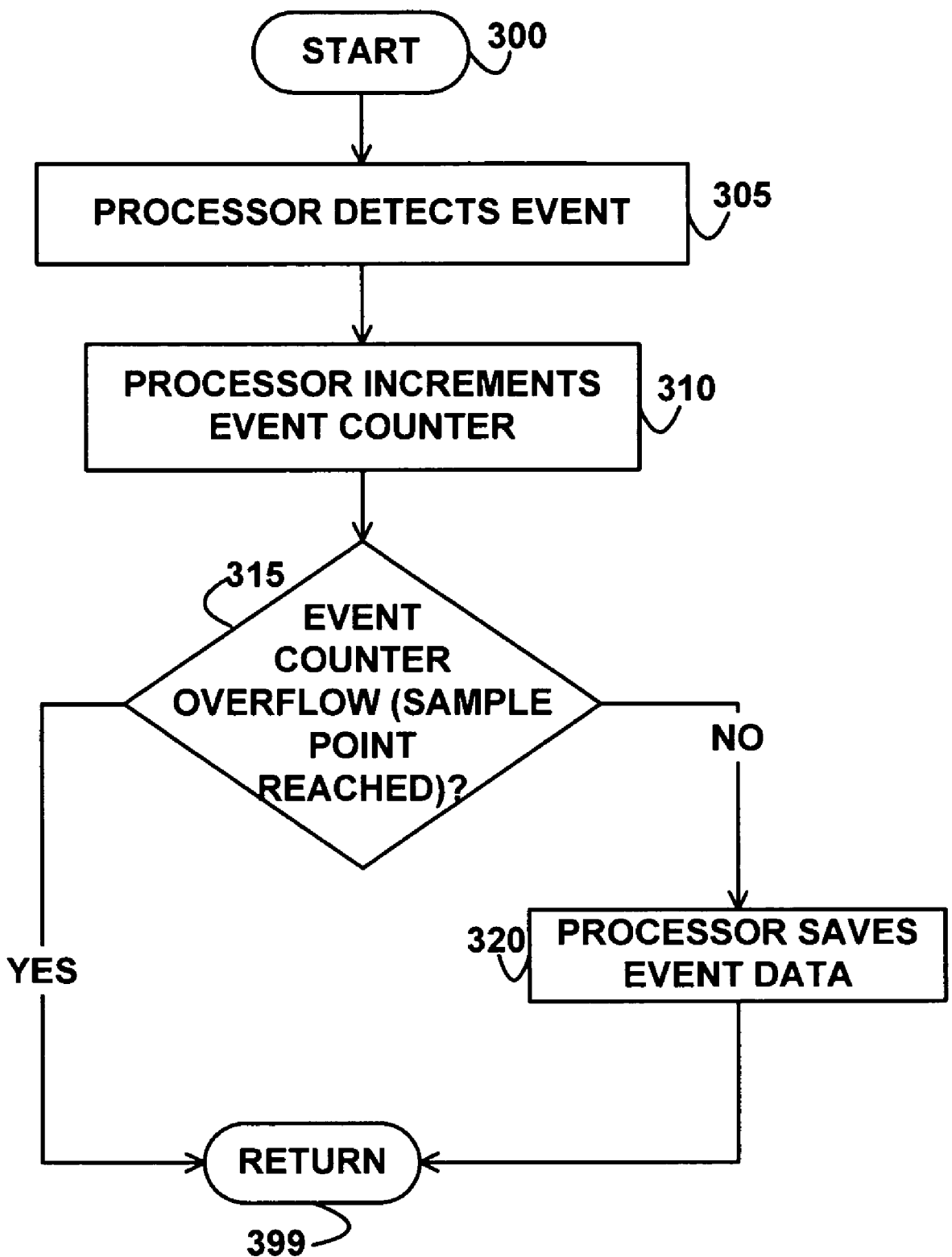
FIG. 3 depicts a flowchart of example processing for responding to an event, according to an embodiment of the invention.

FIG. 3 depicts a flowchart of example processing for responding to an event, according to an embodiment of the invention. Control begins at block 300. Control then continues to block 305 where the processor 101 detects the occurrence of an event based on the event types specified in the control register 220. Control then continues to block 310 where the processor increments the event counter 215 associated with the event. Control then continues to block 315 where the processor 101 determines whether the event counter 215 has overflowed (exceeded the sampling interval 270), indicating that a sample point has been reached.

If the determination at block 315 is true, then the event counter 215 has exceeded the sampling interval 270, so control then continues to block 399 where the logic of FIG. 3 returns. If the determination of block 315 is false, then the event counter 215 has not exceeded the sampling interval 270, so control continues to block 320 where the processor saves data associated with the encountered event in the sample event data 210. Control then continues to block 399 where the logic of FIG. 3 returns.

Figure 4:
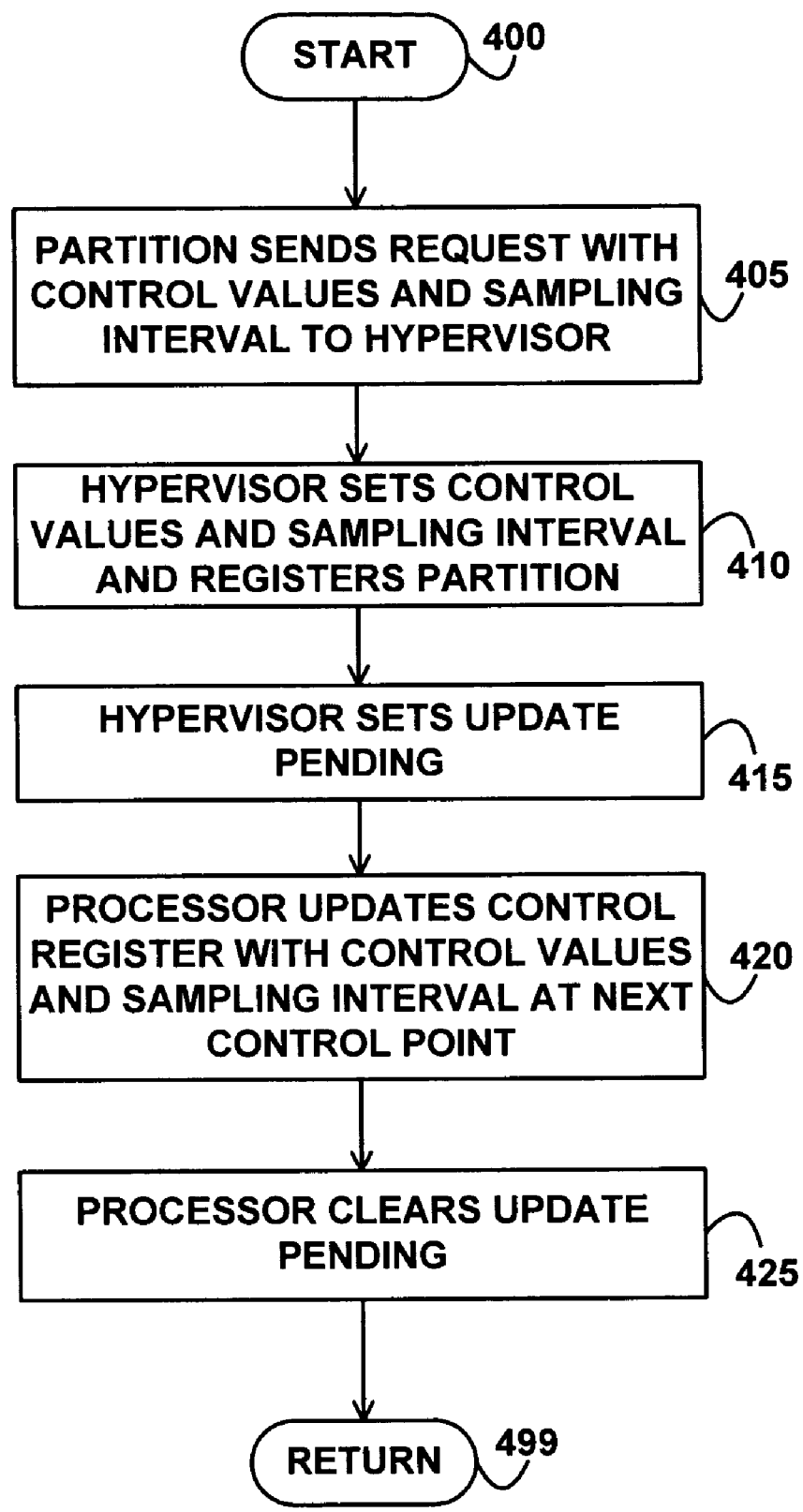
FIG. 4 depicts a flowchart of example processing for registering a partition, according to an embodiment of the invention.

FIG. 4 depicts a flowchart of example processing for registering a partition 134, according to an embodiment of the invention. Control begins at block 400. Control then continues to block 405 where the partition 134 sends a registration request for the system-wide address sampling mode of the hypervisor 136 (exclusive control of the address sampling facility 205) along with values for the control register values 265 and a sampling interval 270. Control then continues to block 410 where the hypervisor 136 sets the control values and the sampling interval received from the partition 134 into the control register values 265 and the sampling interval 270, respectively. The hypervisor 136 further sets the state 260 to indicate that the requesting partition 134 has exclusive control of the address sampling facility and that the hypervisor 136 is in system-wide address sampling mode.

Control then continues to block 415 where the hypervisor 136 sets the update pending indicator 275 to request the processor 101 to read the control values 250 at the next control point. Control then continues to block 420 where the processor 101 encounters the next control point, detects that the update pending indicator 275 is set, and in response, updates the control register 220 with the control register values 265 and updates the event counter 215 with the sampling interval 270. Control then continues to block 425 where the processor 101 clears the update pending indicator 275. Control then continues to block 499 where the logic of FIG. 4 returns.

Figure 5:
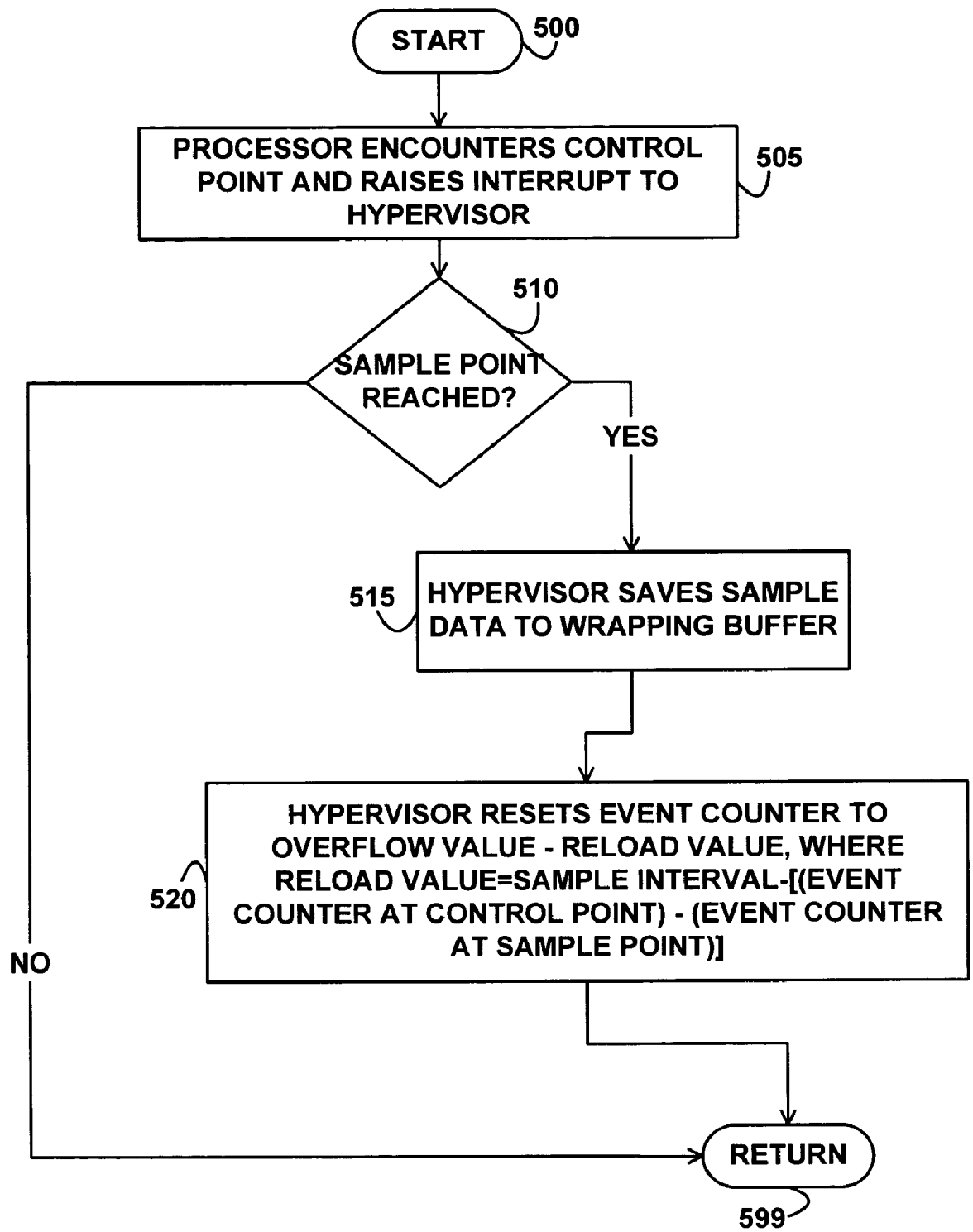
FIG. 5 depicts a flowchart of example processing for responding to a control point, according to an embodiment of the invention.

FIG. 5 depicts a flowchart of example processing for responding to a control point, according to an embodiment of the invention. Control begins at block 500. Control then continues to block 505 where the processor 101 encounters a control point and, in response, raises an interrupt to the hypervisor 136. A control point is a mechanism that allows the hypervisor 136 to gain control of the processor 101 at instrumented points within the processor 101. Thus, in an embodiment, the processor 101 raises an interrupt when the processor 101 accesses designated logic, which in various embodiments may be decrementer interrupt handler logic, logic that handles partition switching (giving control back to the hypervisor 136 when the partition 134 has no further work to perform), or any other appropriate logic.

Control then continues to block 510 where the hypervisor 136 determines whether a sample point has been reached by determining whether the event counter 215 has overflowed (exceeded the threshold specified in the sampling interval 270). If the determination at block 510 is true, then a sample point has been reached, so control continues to block 515 where the hypervisor 136 retrieves the sample event data 210 from the processor 101 and saves it to the wrapping buffer 140.

Control then continues to block 520 where the hypervisor 136 resets the event counter 215 to a reset value, which the hypervisor 136 calculates to be the overflow value of the event counter 215 (the current value of the event counter 215 since the event counter 215 continues to increment following the overflow condition, as previously described above with reference to FIG. 3) minus a reload value. The hypervisor 136 calculates the reload value to be the sampling interval 270) minus [(the value of the event counter 215 at the time of the control point) minus (the value of event counter 215 at the time of the sample point)]. The value of the event counter 215 at the time of the control point is the current value of the event counter 215, i.e., the number of events that the processor 101 detected between control points. The value of the event counter 215 at the time of the sample point is the sample interval 270, which is number of events that the processor 101 detected between sample points, after which the overflow condition was detected at block 315, as previously described above with reference to FIG. 3.

Thus, this calculation and resetting of the event counter 215 value causes the processor 101 to generate the next sample point at a time that is a sampling interval 270 number of events from the previous sample point, which provides evenly-spaced sample intervals of event data within one processor 101. This resetting of the event counter 215 also spreads a distribution of samples between the processors 101 if the computer system 100 has a mixed processor configuration of dedicated and shared processors, so long as the value of the sampling interval 270 is greater than the maximum time between control points (expressed in number of events), and so long as the value of the sampling interval 270 is not a multiple of the maximum time between control points multiplied by the fraction of the processor units that are allocated to the partitions 134. Control then continues to block 599 where the logic of FIG. 5 returns.

If the determination at block 510 is false, then a sample point has not been reached, so control continues from block 510 to block 599 where the logic of FIG. 5 returns.

Figure 6:
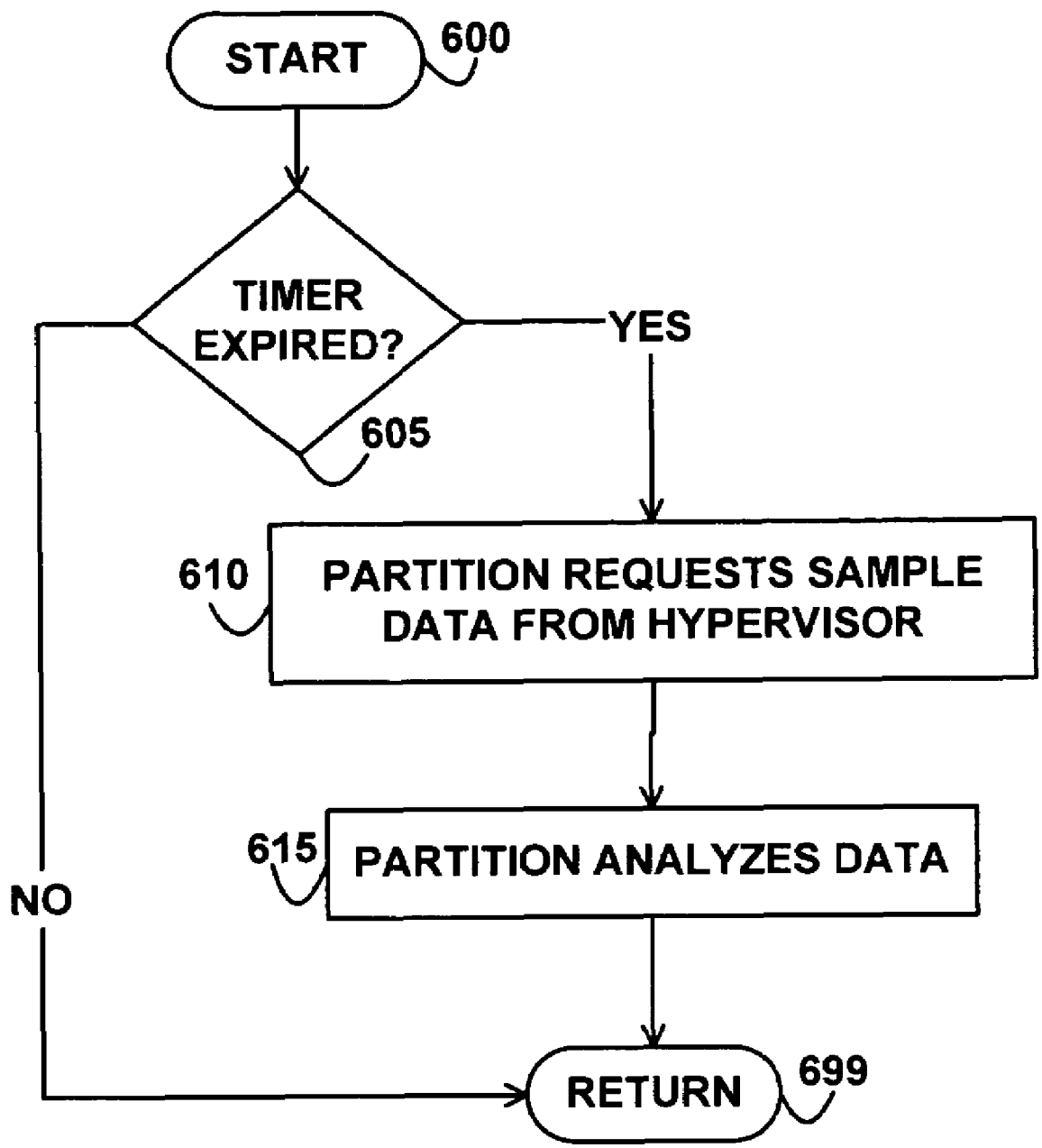
FIG. 6 depicts a flowchart of example processing for processing sample data, according to an embodiment of the invention.

FIG. 6 depicts a flowchart of example processing for processing sample data, according to an embodiment of the invention. Control begins at block 600. Control then continues to block 605 where the partition 134 (or performance tool application 144 within the partition 134) determines whether a timer has expired. If the determination at block 605 is true, then the timer has expired, so control continues to block 610 where the partition 134 requests the sample event data from the hypervisor 136. In response, the hypervisor 136 sends the sample event data from the wrapping buffer 140 to the partition 134. Control then continues to block 615 where the performance tool application 144 within the partition 134 analyzes the sample event data or stores the sample event data for later analysis. Control then continues to block 699 where the logic of FIG. 6 returns.

If the determination at block 605 is false, then the timer has not expired, so control continues from block 605 to block 699 where the logic of FIG. 6 returns. Thus, the partition 134 periodically retrieves the sample event data from the wrapping buffer 140.

Figure 7:
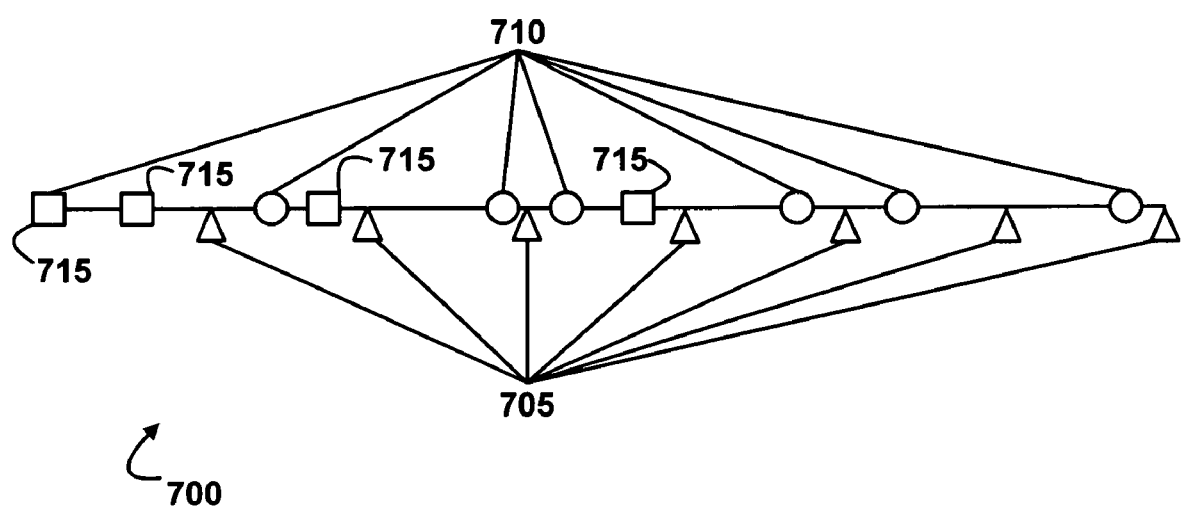
FIG. 7 depicts a block diagram illustrating an example distribution of control points and sample points, according to an embodiment of the invention.

FIG. 7 depicts a block diagram illustrating an example distribution 700 of sample points 705, control points 710 where the hypervisor 136 retrieves event data from the processor 101, and control points 715 where the hypervisor 136 does not retrieve event data from the processor 101. The sampling interval 270 is represented by the distance (number of events) between each of the sample points 705, and the sample points 705 are evenly distributed, so that the numbers of events encountered by the processor 101 during each sampling interval are identical.

The control point intervals (represented by the distance between the various control points 710 and 715) are not necessarily evenly distributed in time. In response to the processor 101 encountering the control points 710, the hypervisor 136 retrieves the sample event data 210 associated with the previous sampling interval. In response to the processor 101 encountering the control points 715, the hypervisor 136 does not retrieve sample event data 210 because the event counter 215 has not exceeded the sampling interval 270, as previously described above with reference to block 510 in FIG. 5.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   retrieving event data associated with a plurality of events from a processor at a plurality of control points for a plurality of sampling intervals, wherein the processor executes instructions for a plurality of logical partitions and wherein the plurality of control points are unevenly distributed in time, wherein the retrieving further comprises if the plurality of sample points have been reached, retrieving the event data from the processor, wherein the event data is associated with the plurality of events that were detected by the processor during the plurality of sampling intervals;
   calculating an even distribution of the plurality of sampling intervals, wherein a plurality of sample points bound an end of the respective plurality of sampling intervals, wherein the calculating the even distribution further comprises if the plurality of sample points have been reached, resetting an event counter to a plurality of reset values, wherein the plurality of reset values cause the processor to include an identical number of the events in each of the plurality of sampling intervals, wherein the calculating the even distribution further comprises calculating the plurality of reset values based on the event counter at a time of the respective control point, the event counter at a time of the respective sample point, and the number of events in the plurality of sampling intervals;
   receiving a plurality of interrupts from the processor at the plurality of respective control points; and
   in response to each of the plurality of interrupts, determining whether each of the plurality of sample points have been reached.

2. The method of claim 1, wherein the processor increments the event counter upon encountering each of the plurality of events and stops saving the event data when each of the plurality of sample points occurs.

3. The method of claim 1, further comprising:
   communicating a type of the events from one of the logical partitions to the processor.

4. A storage medium encoded with instructions, wherein the instructions when executed perform the method comprising:
   retrieving event data associated with a plurality of events from a processor at a plurality of control points for a plurality of sampling intervals, wherein the processor executes instructions for a plurality of logical partitions and wherein the plurality of control points are unevenly distributed in time, wherein the retrieving further comprises if the plurality of sample points have been reached, retrieving the event data from the processor, wherein the event data is associated with the plurality of events that were detected by the processor during the plurality of sampling intervals;
   calculating an even distribution of the events in each of the plurality of sampling intervals, wherein a plurality of sample points bound an end of the respective plurality of sampling intervals, wherein the calculating the even distribution further comprises if the plurality of sample points have been reached, resetting an event counter to a plurality of reset values, wherein the plurality of reset values cause the processor to include an identical number of the events in each of the plurality of sampling intervals, wherein the calculating the even distribution further comprises calculating the plurality of reset values based on the event counter at a time of the respective control point, the event counter at a time of the respective sample point, and the number of events in the plurality of sampling intervals;
   receiving a plurality of interrupts from the processor at the plurality of respective control points; and
   in response to each of the plurality of interrupts, determining whether each of the plurality of sample points have been reached.

5. The storage medium of claim 4, wherein the processor increments the event counter upon encountering each of the plurality of events and stops saving the event data when each of the plurality of sample points occurs.

6. The storage medium of claim 4, further comprising:
communicating a type of the events from one of the logical partitions to the processor.

7. A method for configuring a computer, comprising:
configuring the computer to retrieve event data associated with a plurality of events from a processor at a plurality of control points for a plurality of sampling intervals, wherein the processor executes instructions for a plurality of logical partitions and wherein the plurality of control points are unevenly distributed in time, and wherein the event data is associated with the plurality of events that were detected by the processor during the plurality of sampling intervals, wherein a plurality of sample points bound an end of the respective plurality of sampling intervals, wherein the configuring the computer to retrieve the event data further comprises configuring the computer to, if the plurality of sample points have been reached, retrieve the event data from the processor; and configuring the computer to calculate an even distribution of the events in each of the plurality of sampling intervals, wherein the configuring the computer to calculate further comprises configuring the computer to, if the plurality of sample points have been reached, reset an event counter to a plurality of reset values, wherein the plurality of reset values cause the processor to include an identical number of the events in the plurality of sampling intervals, wherein the configuring the computer to calculate further comprises configuring the computer to calculate the plurality of reset values based on the event counter at a time of the respective control point, the event counter at a time of the respective sample point, and the number of events in the plurality of sampling intervals;

configuring the computer to receive a plurality of interrupts from the processor at the plurality of respective control points; and configuring the computer to, in response to each of the plurality of interrupts, determine whether each of the plurality of sample points have been reached.

8. The method of claim 7, wherein the processor increments the event counter upon encountering each of the plurality of events and stops saving the event data when each of the plurality of sample points occurs.

* * * * *